June 7, 1949.  O. KRAUER ET AL  2,472,538
ALTERNATOR CONTROL SYSTEM
Filed March 5, 1946
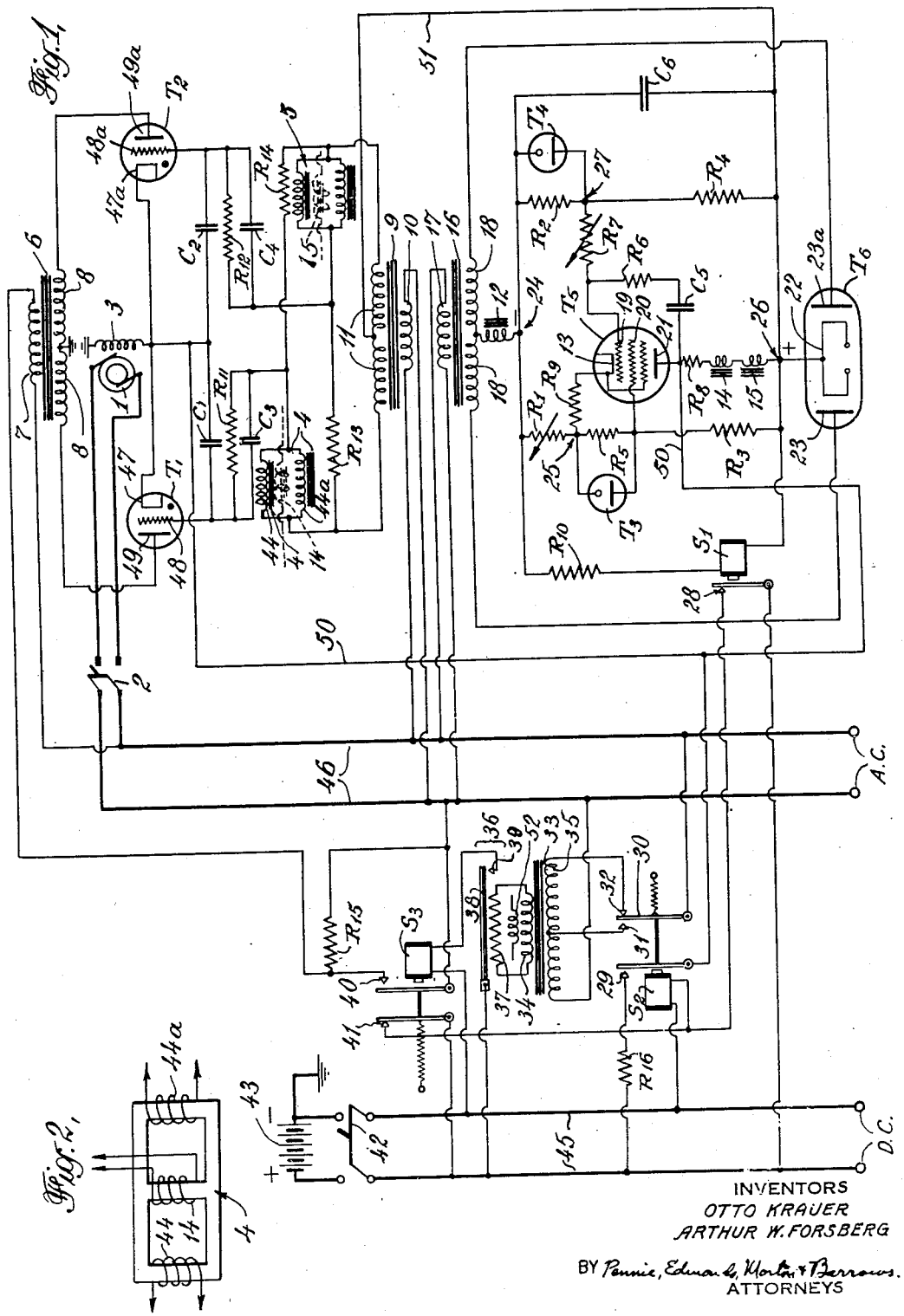
INVENTORS
OTTO KRAUER
ARTHUR W. FORSBERG
BY Pennie, Edmonds, Morton & Barrows.
ATTORNEYS Patented June 7, 1949

2,472,538

UNITED STATES PATENT OFFICE 2,472,538

ALTERNATOR CONTROL SYSTEM

Otto Krauer, Yonkers, and Arthur W. Forsberg, Kew Gardens, N. Y., assignors, by mesne assignments, to Gaveco Laboratories, Inc., New York, N. Y., a corporation of New York Application March 5, 1946, Serial No. 653,077

11 Claims. (Cl. 322—28)

This invention relates to the control of the output voltage of alternating-current electric generators, and has for its object the automatic control thereof over wide ranges of speed and load. The invention is applicable to such generators operated either singly, or several in parallel, and is particularly useful in aircraft.

The recent development of aircraft, especially of airplanes, has resulted in a great increase in the demand for electric power on the planes, the electric equipment of modern airplanes consuming 30 kilowatts or more. Because of commutation and other difficulties experienced with direct-current equipment the industry has selected, as standard, alternating-current generators of 400 cycles. The control system of the present invention below described may, therefore, be assumed to be applicable to such generators, although it is equally useful in connection with a wide variety of alternating-current generators.

The problem of satisfactory regulation of the output voltage of electric generators on airplanes has been especially great, chiefly because of two factors, viz., (1) the generators are customarily driven by the engines which propel the airplanes, and therefore, are subject to great changes in speed, normally resulting in equal changes of generated voltage; and (2) the control apparatus heretofore employed for stationary or land installation is impracticable for aircraft because of its weight of bulk, or both.

The control system in accordance with the present invention provides regulation as close as 2% and with extremely fast response. For example, upon the initiation of an overload or short-circuit, the line voltage can be restored after an interval of approximately ten cycles of 400 cycles per second. Furthermore, the system of this invention, when applied to a plurality of alternators connected in parallel, is completely self-synchronizing, no additional synchronizing apparatus being required. A further advantage resulting from the invention resides in the light weight and compactness of the components by reason of which the equipment is entirely practicable for use on aircraft.

Briefly, the system in accordance with the invention automatically controls the field current of the alternator by means of a grid-controlled gas-filled rectifier tube. The rectification of this tube is controlled by phase control or grid-potential control, or preferably by both combined. The "standard" in relation to which the control potentials applied to the above-mentioned rectifier tube are derived, is included in a bridge circuit having several novel features, later to be described. In addition, certain relay circuits are provided to facilitate proper starting and operation of the control system between zero and maximum speed of the alternator. A more complete understanding of the invention can be had from consideration of the following description taken together with the accompanying drawing in which:

Fig. 1 is a circuit diagram of the control system in accordance with this invention; and Fig. 2 represents a form of saturable core reactance which may be employed therein.

The alternating-current generator or alternator 1 to be controlled is connected through a line switch 2 to the alternating-current line 46. (Hereinafter, the customary abbreviations "A. C." and "D. C." will be employed in the place of the words "alternating current" and "direct current," respectively.) The generator is provided with a field winding 3, which should be energized by uni-directional current. For this purpose the field winding 3 is connected in a rectifier circuit which, in turn, is energized from the A. C. line. Accordingly, rectifier tubes T₁ and T₂ of the grid-controlled gas-filled type, which, for example, might comprise Thyratrons of type CE 306, are connected in a full-wave rectification circuit, wherein anodes 49 and 49a are connected to the terminals of the secondary winding 8 of transformer 6, the midpoint of this winding being grounded. One end of field winding 3 is also grounded, and the other end is connected to cathodes 47 and 47a to rectifier tubes T₁ and T₂, respectively. Primary 7 of transformer 6 is connected through a control relay, later to be described, to the A. C. line 46. Thus the rectifier tubes T₁, T₂ are energized from the A. C. line.

In order to control the current flowing in field winding 3, a phase control circuit is provided whereby the phase of the potentials on anodes 49 and 49a may be varied in respect to the potentials on the control grids 48 and 48a, respectively, of these rectifier tubes This phase control circuit includes transformer 9, the primary 10 of which is connected to the A. C. line 46, and the secondary 11 of which is connected through suitable impedance elements to the two control grids 48 and 48a. These impedance elements comprise saturable core reactor windings 4 and 5 and resistor elements R₁₃ and R₁₄. From the circuit diagram it will be noted that resistor R₁₃ and reactor windings 5 are connected in series across the terminals of coil 11, and that resistor 14 and reactor windings 4 are connected in series also across the terminals of coil 11, but in a reverse sense. The phase control circuit also includes a connection from the grid 48 of tube T₁ to a point between reactor windings 4 and resistor 14, and another connection from grid 48a of tube T₂ to a point between resistor R₁₃ and reactor windings 5. Resistances R₁₁ and R₁₂ are inserted to limit the grid current; capacitors C₁ and C₂ are connected between grids 48 and 48a, and cathodes 47 and 47a, respectively, to improve the operation of the rectifier tubes.

Reactor windings 4 and 5 comprise the A. C. windings of two saturable-core reactors which may be of well-known type, and in this case should be similar. An illustration of such a saturable core reactor is given in Fig. 2, wherein the A. C. windings 44 and 44a are shown on separate legs of a closed magnetic core, a center leg being provided for a D. C. winding 14. This reactor is represented by windings 44, 14 in Fig. 1. It is well known that the reactance provided by such a saturable core reactor is maximum when no D. C. current flows through the D. C. coil and that the effective reactance decreases with increase of D. C. current through the D. C. coil. The D. C. windings of reactors 4 and 5 are shown connected in the bridge circuit in the lower part of the circuit diagram, as will be explained below. By connecting these D. C. coils of the two reactors in series it is possible to vary the effective reactance of both reactors simultaneously and to the same degree, so that the operation of rectifiers T₁ and T₂ will be balanced, and result in satisfactory full-wave rectification. By varying the current through the D. C. coils it is possible to control the magnitude of the rectified current substantially from zero to full capacity of the rectifier tubes.

In accordance with usual rectifier circuits it would be expected that a common connection from cathodes 47 and 47a of rectifier tubes T₁ and T₂ would terminate at the center tap of secondary winding 11 of power transformer 9. However, in accordance with the present invention, this common connection 50 is terminated at a suitable point in the bridge circuit below described, and a return connection 51 from the bridge circuit is brought to the center tap of secondary winding 11. By this means a controllable biasing potential is impressed on the control grids 48 and 48a of tubes T₁ and T₂ with respect to the cathodes 47 and 47a thereof, whereby additional control of the rectification of those tubes is attained.

In the right-hand lower portion of the diagram of Fig. 1 a bridge circuit is represented. From this bridge circuit potentials are derived in response to which the current in the generator field winding 3 is controlled and hence the voltage generated by alternator 1 is regulated. By operation of the bridge circuit these control potentials derived from the bridge circuit vary automatically in accordance with changes in the potential of the A. C. line, from which it follows that the A. C. line voltage may be automatically controlled. The bridge circuit includes adjustable means whereby the A. C. line voltage may be predetermined and manually varied over a wide range, with the assurance that such predetermined or preselected line voltage will be automatically maintained.

Accordingly, the bridge circuit includes a first pair of conjugate points 24, 26 and a second pair of conjugate points 25, 27. Across the first pair of conjugate points 24, 26 is connected a source of D. C. or uni-directional current derived from a suitable rectifier T₆ energized from the A. C. line 46 through transformer 16, which includes primary winding 17 and secondary winding 18. It is preferable that this D. C. power supply comprise a full-wave rectifier, such as type 5R4, including a double cathode 22 and separate anodes 23 and 23a. In order to furnish appropriate voltage at the proper polarity, the cathodes 22 are connected to conjugate point 26 and the center tap of secondary 18 is connected to conjugate point 24, anodes 23 and 23a being connected, respectively, to the terminals of secondary winding 18.

It will thus be seen that in this manner fluctuations in A. C. line voltage will result in corresponding fluctuations of direct-current potential across conjugate points 24 and 26. The second pair of conjugate points of the bridge circuit comprise points 25 and 27. Consequently, when the bridge is balanced no potential will be developed across them. However, because of the arrangement of this bridge, a change of voltage across points 24, 26 will unbalance the bridge, and a corresponding unbalance voltage will be present across points 25, 27.

The four arms of the bridge circuit comprise resistors R₁, R₂, R₅—R₃ and R₄. By connecting a voltage regulator tube T₄, such as type VR150—30, across one arm, R₂, the bridge balance will change with any change of impressed potential between points 24 and 26. This is because the potential drop across resistor R₂ is held constant by voltage regulator tube T₄ connected across it so as to comprise a reference voltage, whereas the voltage drops across the resistors comprising the remaining three arms of the bridge will change with impressed potential across points 24, 26. By making one of these three resistor arms, such as R₁, adjustable, the impressed voltage at which the bridge is balanced may be varied, and thus means are provided for predetermining and adjusting the generator A. C. line voltage which is to be maintained by the control system. In order that the relation between the alternating-current line voltage and the direct-current voltage impressed across points 24 and 26 remain fixed, the rectifier T₆ should be of such type that the voltage drop across the rectifier is constant. Most vacuum tube rectifiers have such a characteristic, and the type 5R4 has been found suitable.

From the foregoing it will be observed that fundamentally the direct-current windings of the saturable core reactors might be connected between points 25, 27 of the bridge, and indeed, in many applications to which this invention may be applied, such an arrangement is satisfactory. However, if minimization of weight of the apparatus is a consideration, as in aircraft applications, it is preferable to employ the equivalent circuit arrangement shown in the diagram. This arrangement includes a vacuum tube amplifier the input circuit of which is connected between the conjugate points 25, 27 and the output circuit of which is connected to include the direct-current windings 14, 15 of the saturable core reactors. For this purpose a vacuum tube of the pentode type, such as type 6AC7, is suitable. As shown in the diagram, the cathode 13 of such a tube may be connected to one conjugate point 25, and the control grid 19 connected to the other conjugate point 27. It has been found desirable to connect a resistor R₉ in series with the cathode 13 to make the operation of the tube more stable. Such a resistor is known in the art as a cathode follower. It has also been found desirable, in the arrangement shown, to include an adjustable resistor $R_7$ in series between the grid 19 and conjugate point 27 and another resistor $R_6$ and a capacity $C_5$ between grid 19 and anode 21, also to improve the stability of the circuit, as will be explained below.

Consideration of the diagram will show that by impressing on the control grid and cathode of $T_5$ the changes in potential occurring between points 25 and 27, the resulting control effect is inherently polarized, viz., changes in potential between points 25 and 27 effect corresponding changes in current in the anode circuit of tube $T_5$ only when point 25 is positive with respect to point 27 and not when its polarity is reversed. This is a desirable condition because the D. C. coils 14, 15 provide the same effect regardless of direction of current through them. To retain the desired operation when no tube such as $T_5$ is employed, an equivalent arrangement which will polarize the effect of the difference of potential across points 25, 27 may be used, such for example, as a D. C. polarizing winding connected in series with resistor $R_2$ across tube $T_4$.

The amplifier tube $T_5$ represented in the diagram includes a screen grid 20 which is connected to the cathode 13 through resistor $R_5$. It has been found desirable to connect across resistor $R_5$ a voltage regulator tube $T_3$, which may be similar to tube $T_4$, in order to hold constant the potential on the screen grid 20, so that the amplification of the tube will be more constant. Reactance or choke 12 together with capacitor $C_6$ comprise a filter to smooth out the ripples in the uni-directional potential impressed across conjugate points 24, 26. The complete anode circuit of tube $T_5$ beginning at anode 21 thereof, includes resistor $R_3$, D. C. windings 14 and 15, cathode 22 of rectifier $T_6$, anodes 23, 23a thereof, secondary winding 18 of transformer 16, choke coil 12, resistors $R_1$ and $R_9$ and cathode 13 of tube $T_5$. Of this circuit, the portion included between anode 21 of tube $T_5$ and cathode 22 of tube $T_6$ is of particular interest in connection with the present invention. In this portion of the anode circuit resistor $R_3$ is connected in series with D. C. windings 14 and 15 of the two variable-core reactors above mentioned. Thus, variations in potential appearing across conjugate points 25, 27 are effectively amplified by tube $T_5$ to cause a corresponding current to flow through the elements $R_3$, 14 and 15. The uni-directional current flowing through D. C. windings 14 and 15 of the saturable-core reactors varies the effective reactance thereof in the manner previously explained. The inclusion of resistor $R_3$ in this circuit provides a point negative with respect to the positive conjugate point 26 of the bridge. This point is at the terminal of resistor $R_3$ which is connected to anode 21 of tube $T_5$, and to this point lead 50 from the cathodes 47, 47a of tubes $T_1$ and $T_2$ is connected so as to cause the grids 48 and 48a of those tubes to be more positive than the cathodes thereof by the amount of the potential drop in the anode circuit of tube $T_5$ between anode 21 thereof and cathode 22 of tube $T_6$. Most of this potential drop is likely to be in resistor $R_3$.

In the circuit illustrated in the drawing, the resistor $R_7$ need ordinarily be adjusted only in connection with the particular type of tube $T_5$ to be employed when the equipment is put into initial operation. It would, therefore, not usually be readjusted during use of the equipment, and hence could be or the so-called "screw driver" type of adjustment. In the particular embodiment of the invention represented in the drawing and herein specifically described by way of example, the stabilizing circuit $C_5$, $R_6$, $R_7$ is included to prevent generation of undesired oscillations especially at low audio frequencies. The value of capacity $C_5$ is selected to provide a reactance which, at the frequency of the oscillations to be prevented, is negligible compared to the resistance of $R_6$ and $R_7$ in series. The ratio of the resistance value of $R_7$ with respect to that of $R_6$ determines the degree of derivative feedback which provides the stabilization control. This stabilizing circuit was proposed by Paul T. Hadley for use in connection with the control system of the present invention.

Although, as above pointed out, the control system of this invention may be employed to control the line voltage of any alternating current generator or generators, it is especially well adapted for use on aircraft. Accordingly, the auxiliary equipment now to be described is suitable for use on airplanes.

Although in large aircraft most of the electrical apparatus is customarily energized by alternating current, there is usually need for a small amount of direct current, and for this purpose a storage battery is usually carried. Such a battery 43, assumed to be a storage battery of 28 volts, is shown to be connectible to D. C. line 45 by line switch 42. The negative terminal of the battery 43 is grounded to the frame of the aircraft, as indicated. It is convenient to employ this battery to energize suitable relay circuits which effect substantially automatic operation of the control system in accordance with the invention. The essential nature and functions of the relays employed will best be understood through a description of the operation of the system illustrated in the drawing, the actual circuit connections being clearly shown.

*Operation*

It may be assumed that the generator 1 and all of the control equipment herein referred to is installed on an airplane, and that generator 1 is driven by a prime mover, such as an airplane engine, subject to considerable variation in speed, the prime object being to maintain the A. C. line voltage substantially constant regardless of wide variations in speed and load.

Closure of battery line switch 42 energizes relay $S_2$ closing contacts 29 and causing direct current to flow through current-limiting resistor $R_{16}$, through generator field winding 3, returning through ground to the battery 43. Such direct-current energization of the generator field will give a no-load A. C. output of about one-half rated voltage.

Operation of relay $S_2$ opens contact 32 and closes contact 31 through armature 30 which connects one-half of the primary winding 35 of transformer 33 across the A. C. line. The secondary 34 of transformer 33 is connected to the heating element 37 of a thermal relay 36, the contacts of this relay being normally open, as shown. Transformer 33 is so designed that the output voltage thereof from winding 34 is substantially normal when one-half of primary winding 35 is connected across the A. C. line at one-half normal line voltage, and likewise when the entire primary winding 35 is connected across the A. C. line when the line voltage thereof is normal, viz., 120 volts, 400 cycles, at, say, 6,000

R. P. M. Hence, closure of contact 31 which couples the A. C. line (assumed to be at ½ voltage) to secondary winding 34 of transformer 33 energizes heater 37 of thermal relay 36, closing contact 39. This relay has the same heating characteristics as the anode heaters of tubes $T_1$ and $T_2$. Hence, when relay 36 operates, tubes $T_1$ and $T_2$ may be assumed to have been raised to operating temperature. The cathodes or cathode heaters of all of the tubes here represented preferably are energized from the A. C. line by suitable secondary windings on transformer 33. Such windings are represented in the diagram by secondary 52. By this means the cathodes of the various tubes may be automatically brought to operating temperature at low A. C. line voltage, thereby permitting the control circuit to function before the line voltage is up to normal.

The actuation of relay 36, by closing contact 39, energizes relay $S_3$, closing contact 40 and opening contact 41. Closure of contact 40 short-circuits limiting resistor $R_{15}$ which is in series with the primary 7 of power transformer 6 which, in turn, energizes the anode circuits of gas rectifier or Thyratron tubes $T_1$ and $T_2$.

Closing of contact 40 which connects the primary 7 of transformer 6 across the A. C. line, thus putting one-half rated A. C. voltage on the Thyratron ($T_1$, $T_2$) anode circuits. Hence, the D. C. output from the Thyratron tubes flows through generator field 3 in addition to the D. C. current from the battery. Resistor $R_{16}$ is in series with the battery and limits the current which can flow into the battery when the D. C. output from the Thyratrons exceeds the battery voltage. At this point in the operation, viz., when the A. C. line voltage is about 80% of normal voltage, the direct current through relay $S_1$, which is connected effectively across conjugate points 24, 26 of the bridge circuit above described, is sufficient to actuate this relay, opening contact 28 which deenergizes relay $S_2$, opening contacts 29 and 31 and closing contact 32. Opening contact 29 disconnects the battery 43 from the generator field winding 3; and opening contact 31 and closing contact 32 decreases the step-up ratio of transformer 33 to suit the approximately full line voltage of the A. C. line as previously described, so as to maintain the voltage on heater 37 normal.

From the foregoing it will be clear that the generator voltage has now reached substantially normal line voltage. This voltage will continue under the control of the system shown on the right-hand side of the diagram until the speed of the generator is so low that the line voltage drops to approximately one-half normal. At this point in the operation the various relays will shift to take up the control until such time as the generator field can increase in a normal manner.

Contact 41 of relay $S_3$ interlocks with relay $S_2$ to keep the latter relay energized if the engine speeds up to regenerate normal A. C. line voltage before the tubes are heated. This might occur in the case of an airplane when the engines are suddenly "opened wide" or substantially so, to test them before take off. Of course, after sufficient time has elapsed to permit the normal operating temperature of the tubes to be reached, relay 36 will have operated and contacts 41 would already be open.

It has already been pointed out that two or more A. C. generators may be controlled with equal facility by means of the present invention. To effect such multiple operation it is required merely to employ as many control circuits as herein described as there are generators to be controlled, to connect the A. C. outputs of the several generators to the same A. C. line (46), and to connect in parallel the direct-current coils of the corresponding saturable core reactors. If the generators have the same torques they will have the same reactive loads.

In order to permit those skilled in the art more easily to practice the invention above described, the following circuit constants are given as illustrating one application of the preferred embodiment of the invention:

| | | |
|---|---|---|
| $R_1$ (variable) | ohms | 2,600 |
| $R_2$ | do | 12,400 |
| $R_3$ | do | 500 |
| $R_4$ | do | 6,950 |
| $R_5$ | do | 4,000 |
| $R_6$ | do | 250,000 |
| $R_7$ (variable) | do | 100,000 |
| $R_8$ | do | 5,000 |
| $R_9$ | do | 500 |
| $R_{10}$ | do | 70,000 |
| $R_{11}$ | do | 200,000 |
| $R_{12}$ | do | 200,000 |
| $R_{13}$ | do | 50,000 |
| $R_{14}$ | do | 50,000 |
| $R_{15}$ | do | 25 |
| $R_{16}$ | do | 20 |
| $C_1$ | microfarads | .0005 |
| $C_2$ | do | .0005 |
| $C_3$ | do | .01 |
| $C_4$ | do | .01 |
| $C_5$ | do | .5 |
| $C_6$ | do | 3 |

What is claimed is:

1. In a system for automatically regulating the output line voltage of an A. C. generator having a D. C. field winding, a first rectifier energized by said line voltage, a bridge circuit comprising four impedance arms at least one of which is resistive, a voltage regulating device connected in said one arm to maintain the voltage drop across the resistance in that arm substantially constant, a rectifier circuit including a gas-filled rectifier tube having a cathode, an anode and a control grid, means coupling said circuit to said A. C. line whereby to energize said field winding with rectified voltage from said line, connections between said first rectifier and one pair of conjugate points of said bridge whereby the rectified voltage therefrom is impressed across said conjugate points, a saturable-core reactor having an A. C. winding and a D. C. winding, said D. C. winding being connected to said bridge so that current flows through said D. C. winding in response to a difference of potential developed across the other pair of conjugate points of said bridge, means for polarizing the effect of said difference of potential, a phase-control circuit including the A. C. winding of said reactor, said circuit being effectively coupled to said A. C. line so as to be energized therefrom, and connections from the control grid and from the cathode of said tube to different points in said phase control circuit, whereby the energizing current flowing in said field winding is automatically regulated in accordance with fluctuations in A. C. potential in said line.

2. In a system for automatically regulating the output line voltage of an A. C. generator having a D. C. field winding, a first rectifier energized by said line voltage, a bridge circuit comprising four impedance arms at least one of which is resistive, a voltage regulating device connected in said one arm to maintain the voltage drop across the resistance in that arm substantially constant, a gas-filled rectifier tube having a cathode, an anode and a control grid, a transformer having a primary energized from said A. C. line and a secondary connected effectively in series with said field winding, said anode and said cathode, whereby to energize said field winding with rectified voltage from said line, connections between said first rectifier and one pair of conjugate points of said bridge whereby the rectified voltage therefrom is impressed across said conjugate points, a saturable-core reactor having an A. C. winding and a D. C. winding, said D. C. winding being connected to said bridge so that current flows through said D. C. winding in response to a difference of potential developed across the other pair of conjugate points of said bridge, means for polarizing the effect of said difference of potential, a phase-control circuit including the A. C. winding of said reactor, said circuit being effectively coupled to said A. C. line so as to be energized therefrom, and connections from the control grid and from the cathode of said tube to different points in said phase control circuit, whereby the energizing current flowing in said field winding is automatically regulated in accordance with fluctuations in A. C. potential in said line.

3. In a system for automatically regulating the output line voltage of an A. C. generator having a D. C. field winding, a first rectifier energized by said line voltage, a bridge circuit comprising four resistive arms, a voltage regulating device connected in one of said arms to maintain the voltage drop across the resistance in that arm substantially constant, a gas-filled rectifier tube having a cathode, an anode and a control grid, a first transformer having a primary connected to said A. C. line and a secondary connected effectively in series with said field winding, said anode, and said cathode whereby to energize said field winding with rectified voltage from said line, connections including filter elements comprising series inductance and shunt capacitance between said first rectifier and one pair of conjugate points of said bridge whereby rectified and filtered voltage therefrom is impressed across said conjugate points, a saturable-core reactor having an A. C. winding and a D. C. winding, said D. C. winding being connected to said bridge so that current flows through said D. C. winding in response to a difference of potential developed across the other pair of conjugate points of said bridge, means for polarizing the effect of said difference of potential, a phase-control circuit including the A. C. winding of said reactor, a second transformer having a primary connected to said A. C. line and a secondary connected in said circuit, and connections from the control grid and from the cathode of said tube to different points in said phase control circuit, whereby the energizing current flowing in said field winding is automatically regulated in accordance with fluctuations in A. C. potential in said line.

4. In a system for automatically regulating the output line voltage of an A. C. generator having a D. C. field winding, a first rectifier energized by said line voltage, a bridge circuit comprising four impedance arms at least one of which is resistive, a voltage regulating device connected in said one arm to maintain the voltage drop across the resistance in that arm substantially constant, a rectifier circuit including a gas-filled rectifier tube having a cathode, an anode and a control grid, means coupling said circuit to said A. C. line whereby to energize said field with rectified voltage from said line, connections between said first rectifier and one pair of conjugate points of said bridge whereby the rectified voltage therefrom is impressed across said conjugate points, a saturable-core reactor having an A. C. winding and a D. C. winding, impedance means connected across the other pair of conjugate points responsive to the potential difference between said last mentioned points and coupled to said D. C. winding so as to determine the magnitude and direction of current flowing through said D. C. winding, a phase-control circuit including the A. C. winding of said reactor, said circuit being effectively coupled to said A. C. line so as to be energized therefrom, and connections from the control grid and from the cathode of said tube to different points in said phase control circuit, whereby the energizing current flowing in said field winding is automatically regulated in accordance with fluctuations in A. C. potential in said line.

5. In a system for automatically regulating the output line voltage of an A. C. generator having a D. C. field winding, a first rectifier energized by said line voltage, a bridge circuit comprising four impedance arms at least one of which is resistive, a voltage regulating device connected in said one arm to maintain the voltage drop across the resistance in that arm substantially constant, a gas-filled rectifier tube having a cathode, an anode and a control grid, a transformer having a primary energized from said A. C. line and a secondary connected effectively in series with said field winding, said anode and said cathode, whereby to energize said field with rectified voltage from said line, connections between said first rectifier and one pair of conjugate points of said bridge whereby the rectified voltage therefrom is impressed across said conjugate points, a saturable-core reactor having an A. C. winding and a D. C. winding, impedance means connected across the other pair of conjugate points responsive to the potential difference between said last mentioned points and coupled to said D. C. winding so as to determine the magnitude and direction of current flowing through said D. C. winding, a phase-control circuit including the A. C. winding of said reactor, said circuit being effectively coupled to said A. C. line so as to be energized therefrom, and connections from the control grid and from the cathode of said tube to different points in said phase control circuit, whereby the energizing current flowing in said field winding is automatically regulated in accordance with fluctuations in A. C. potential in said line.

6. In a system for automatically regulating the output line voltage of an A. C. generator having a D. C. field winding, a first rectifier energized by said line voltage, a bridge circuit comprising four impedance arms at least one of which is resistive, a voltage regulating device connected in said one arm to maintain the voltage drop across the resistance in that arm substantially constant, a gas-filled rectifier tube having a cathode, an anode and a control grid, a transformer having a primary energized from said A. C. line and a secondary connected effectively in series with said field winding, said cathode and said anode, whereby to energize said field winding with rectified voltage from said line, connections between said first rectifier and one pair of conjugate points of said bridge whereby the rectified voltage therefrom is impressed across said conjugate points causing one to be positive with respect to the other, a saturable-core reactor having an A. C. winding and a D. C. winding, a D. C. amplifier including a vacuum tube having a cathode, an anode and a control grid, said last-named cathode and control grid being connected effectively between the other pair of conjugate points of said bridge, an anode circuit for said vacuum tube connected between the anode of said vacuum tube and the positive one of said first pair of conjugate points, said anode circuit comprising impedance including a resistor and the D. C. winding of said reactor connected in series, and means for automatically controlling the bias on the control grid of said rectifier tube with respect to the cathode thereof, comprising a connection from the cathode of said rectifier tube to a point in the anode circuit of said vacuum tube more negative than the cathode of said first rectifier, and a connection from the cathode of said first rectifier to a point effectively coupled to the A. C. line, whereby the bias potential impressed on the control grid of said rectifier tube is automatically controlled in accordance with the A. C. voltage in said line.

7. In a system for automatically regulating the output line voltage of an A. C. generator having a D. C. field winding, a first rectifier energized by said line voltage, a bridge circuit comprising four impedance arms at least one of which is resistive, a voltage regulating device connected in said one arm to maintain the voltage drop across the resistance in that arm substantially constant, a gas-filled rectifier tube having a cathode, an anode and a control grid, a transformer having a primary energized from said A. C. line and a secondary connected effectively in series with said field winding, said cathode and said anode, whereby to energize said field winding with rectified voltage from said line, connections between said first rectifier and one pair of conjugate points of said bridge whereby the rectified voltage therefrom is impressed across said conjugate points causing one to be positive with respect to the other, a saturable-core reactor having an A. C. winding and a D. C. winding, a D. C. amplifier including a vacuum tube having a cathode, an anode and a control grid, said last named cathode and control grid being connected effectively between the other pair of conjugate points of said bridge, an anode circuit for said vacuum tube connected between the anode of said vacuum tube and the positive one of said first pair of conjugate points, said anode circuit comprising impedance including the D. C. winding of said reactor, a phase control circuit including the A. C. winding of said reactor, said phase-control circuit being effectively coupled to said A. C. line so as to be energized therefrom, and a connection from the control grid of said rectifier tube to a point in said phase control circuit such that the energizing current flowing in said field winding is automatically regulated in accordance with fluctuations in A. C. potential in said line.

8. In a system for automatically regulating the output line voltage of an A. C. generator having a D. C. field winding, a first rectifier energized by said line voltage, a bridge circuit comprising four impedance arms at least one of which is resistive, a voltage regulating device connected in said one arm to maintain the voltage drop across the resistance in that arm substantially constant, a gas-filled rectifier tube having a cathode, an anode and a control grid, a transformer having a primary energized from said A. C. line and a secondary connected effectively in series with said field winding, said cathode, and said anode, whereby to energized said field winding with rectified voltage from said line, connections between said first rectifier and one pair of conjugate points of said bridge whereby the rectified voltage therefrom is impressed across said conjugate points causing one to be positive with respect to the other, a saturable-core reactor having an A. C. winding and a D. C. winding, a D. C. amplifier including a vacuum tube having a cathode, an anode and a control grid, said last-named cathode and control grid being connected effectively between the other pair of conjugate points of said bridge, an anode circuit for said vacuum tube connected between the anode of said vacuum tube and the positive one of said first pair of conjugate points, said anode circuit comprising impedance including a resistor and the D. C. winding of said reactor connected in series, and means for automatically controlling the bias on the control grid of said rectifier tube with respect to the cathode thereof, comprising a connection from the cathode of said rectifier tube to a point in the anode circuit of said vacuum tube more negative than the cathode of said first rectifier, and a connection from the cathode of said first rectifier to a point effectively coupled to the A. C. line, whereby the bias potential impressed on the control grid of said rectifier tube is automatically controlled in accordance with the A. C. voltage in said line, and a phase control circuit including the A. C. winding of said reactor and a resistor connected in series, said phase-control circuit being effectively coupled to said A. C. line so as to be energized therefrom, and a connection from the control grid of said rectifier tube to a point in said phase control circuit between said second resistor and said A. C. winding, whereby the phase of the A. C. potential on the anode of said rectifier tube with respect to the A. C. potential on the control grid thereof is also automatically controlled in accordance with the A. C. voltage in said line.

9. An alternating-current generator control system including, an A. C. generator having a D. C. field winding, a gas-filled rectifier tube having an anode, a cathode, and a biased control grid, said field winding being connected to said rectifier tube so as to be energized by the uni-directional output current therefrom, means for impressing on the grid and anode of said rectifier tube A. C. operating voltages derived from said A. C. generator, rectifier means for separately rectifying output current from said generator to develop a D. C. voltage substantially proportional to the generated A. C. voltage, a balanceable network including an element across which a fixed reference voltage is established, connections from said rectifier means to energize said network, said network being proportioned to establish a D. C. unbalance voltage which is the resultant of the D. C. voltage from said rectifier means and said reference voltage, an amplifier for amplifying said D. C. unbalance voltage, means for automatically varying the D. C. bias of the grid with respect to the cathode of said rectifier tube in response to variation in said amplified D. C. unbalance voltage and means simultaneously actuated by said amplified D. C. unbalance voltage for automatically varying the relative instantaneous phase of said A. C. voltages impressed on the grid and anode, respectively, of said rectifier tube in proportion to changes in generated A. C. voltage so that the rectification of said rectifier tube is controlled in the same sense simultaneously by phase control and bias control, whereby the A. C. output voltage of said generator is automatically maintained substantially constant with wide variation of generator speed and load.

10. An alternating-current generator control system including, an A. C. generator having a D. C. field winding, a gas-filled rectifier tube having a control grid, an anode and a cathode, said field winding being connected to said rectifier tube so as to be energized by the unidirectional output current therefrom, means for impressing on the grid and anode of said rectifier tube A. C. operating voltages derived from said A. C. generator, rectifier means for separately rectifying output current from said generator to develop a D. C. voltage substantially proportional to the generated A. C. voltage, a balanceable bridge including four arms one of which comprises a constant voltage element, said bridge having two pairs of conjugate points, said rectifier means being connected to a first pair of said conjugate points, an amplifier of which the input is connected to the second pair of said conjugate points, and phase control means connected between the output of said amplifier and said rectifier tube for automatically varying the instantaneous phase of the A. C. voltage impressed on the anode of said rectifier tube with respect to that impressed on the grid thereof in proportion to changes in generated A. C. voltage, whereby the A. C. output voltage of said generator is automatically maintained substantially constant with variation of generator speed and load.

11. An alternating-current generator control system including, an A. C. generator having a D. C. field winding, a rectifier tube having an anode, a cathode and a biased control grid, said field winding being connected to said rectifier tube so as to be energized by the unidirectional output current therefrom, means for impressing on the grid and anode of said rectifier tube A. C. operating voltages derived from said A. C. generator, rectifier means for separately rectifying output current from said generator to develop a D. C. voltage substantially proportional to the generated A. C. voltage, a balanceable bridge including four arms one of which comprises a constant voltage element, said bridge having two pairs of conjugate points, said rectifier means being connected to a first pair of said conjugate points, an amplifier of which the input is connected to the second pair of said conjugate points, and connections including a biasing element between said second pair of conjugate points and the grid and cathode, respectively, of said rectifier tube for automatically varying the bias on the grid of said rectifier tube in respect to the cathode thereof in proportion to changes in generated A. C. voltage, whereby the A. C. output voltage of said generator is automatically maintained substantially constant with variation of generator speed and load.

OTTO KRAUER.
ARTHUR W. FORSBERG.

REFERENCES CITED

The following references are of record in the file of this patent:

UNITED STATES PATENTS

| Number | Name | Date |
| --- | --- | --- |
| 1,917,474 | Von Ohlsen et al. | July 11, 1933 |
| 1,936,692 | Stoller | Nov. 28, 1933 |
| 2,161,179 | Logan | June 6, 1939 |